United States Patent [19]

Berwald

[11] Patent Number: 4,484,677
[45] Date of Patent: Nov. 27, 1984

[54] SCRAPER-CHAIN CONVEYORS

[75] Inventor: Werner Berwald, Selm, Fed. Rep. of Germany

[73] Assignee: Gewerkschaft Eisenhutte Westfalia, Lunen, Fed. Rep. of Germany

[21] Appl. No.: 383,548

[22] Filed: Jun. 1, 1982

[51] Int. Cl.³ .............................................. B65G 19/28
[52] U.S. Cl. ..................................... 198/735; 198/861
[58] Field of Search ................... 198/735, 861; 299/34, 299/43

[56] References Cited

U.S. PATENT DOCUMENTS 4,074,804  2/1978  Grundken et al. .................. 198/735
4,422,542  12/1983  Temme et al. ....................... 198/735

FOREIGN PATENT DOCUMENTS 1286489  1/1969  Fed. Rep. of Germany ...... 198/735

Primary Examiner—Robert J. Spar
Assistant Examiner—Jonathan D. Holmes
Attorney, Agent, or Firm—Thompson, Birch et al.

[57] ABSTRACT

A scraper-chain conveyor has channel sections or pans arranged end-to-end along which a scraper-chain assembly is circulated. Each pan is composed of side walls with a floor plate therebetween. Pockets are provided on the exterior of at least one of the side walls to accept and locate the heads of screw-threaded fixing components used to secure attachments to the side wall. The pockets take the form of shaped grooves each extending over substantially the entire height of the side wall. Each groove can receive a number of the heads, typically three, or fillers corresponding to these heads.

9 Claims, 6 Drawing Figures

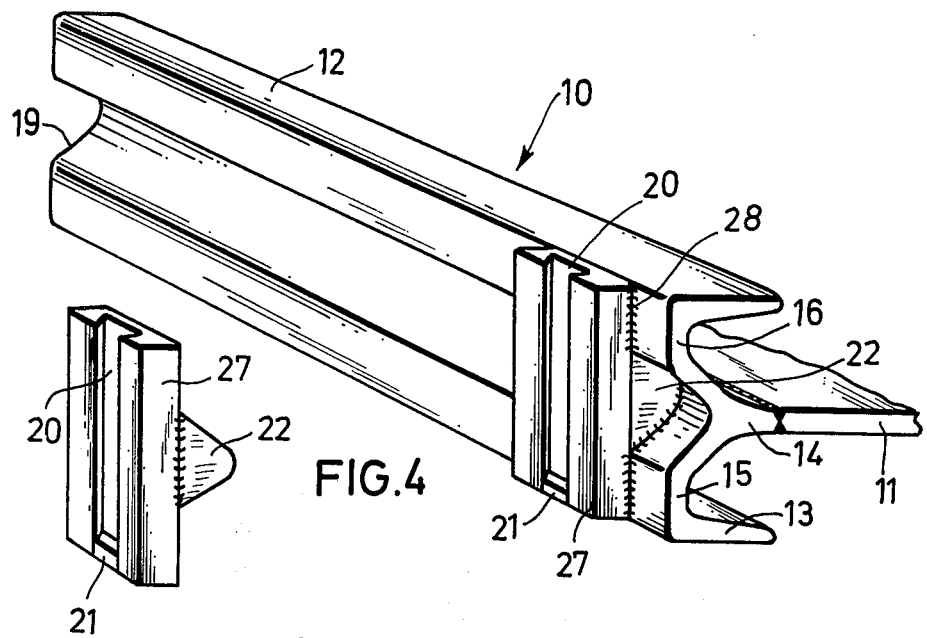
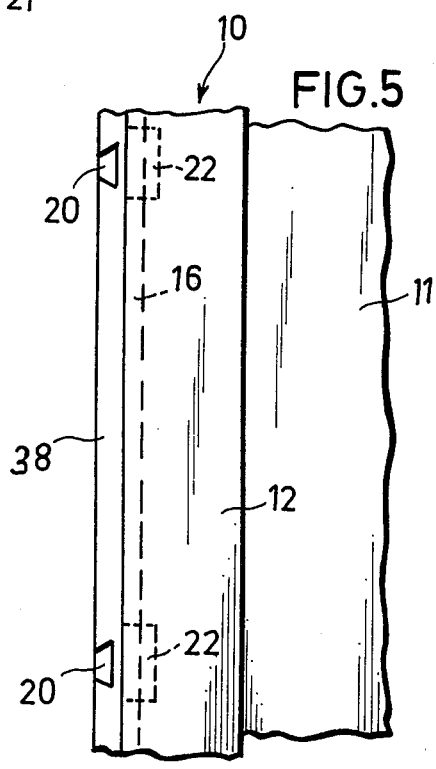
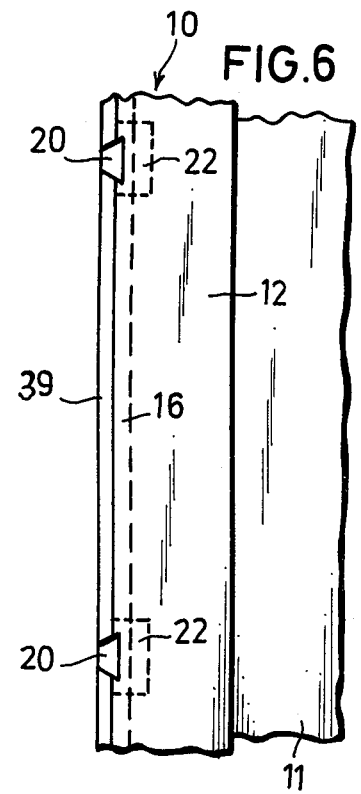

SCRAPER-CHAIN CONVEYORS

BACKGROUND TO THE INVENTION

The present invention relates in general to scraper-chain conveyors as used in mineral, e.g. coal mining.

It is well known to construct such conveyors from a series of channel sections or pans arranged end-to-end and along which a scraper-chain assembly is driven. Each pan is itself usually fabricated from two shaped side walls between which a floor plate is welded. It is known for example from German patent specification Nos. 2531861, 2516082, and 2921412 to reinforce the side walls with the aid of structures or bars extending the full length of the side walls and welded to the side walls. In addition to acting as reinforcements the bars permit attachments, such as spill plates, guides and the like, to be secured to one or both side walls with the aid of bolts located with their heads in recesses or pockets accessible from the exterior. While these prior constructions have been quite satisfactory there is a need for a simpler and cheaper pan construction and a general object of this invention is to provide such a construction.

SUMMARY OF THE INVENTION

In accordance with the invention, at least one of the side walls is provided with pockets for receiving the heads of screw-threaded fixing elements and each pocket can receive a plurality of such heads and takes the form of a groove extending over substantially the entire height of the side wall. In one practical form, the side walls of the pan are sigma-shaped each with an external V-shaped groove extending longitudinally of the wall and the upstanding grooves each extend over upper and lower upstanding web portions of the side wall and over an insert or block which is fixed as by welding into the main V-shaped groove to fill the latter over the zones of the upstanding grooves. The inserts can be welded into the V-shaped groove and they reinforce the side wall over the zone where the attachments are secured with the screw-threaded elements. Three such elements can have their heads superimposed one upon another in each upstanding groove and present outwardly-directed equi-spaced screw-threaded shanks. Conveniently the upstanding grooves are re-entrant to widen inwardly thereby to trap the heads which then have a shape corresponding to that of the grooves. A dovetail of T-shaped profile is suitable.

It is desirable to fill each upstanding groove entirely to prevent the ingress of dirt and where a groove is not used to secure attachments one or more fillers with a shape designed to fill the groove can be used. The heads of the screw-threaded elements also fill the grooves and these heads can be interspersed with one or more fillers where different fixing spacings are desired. In this way, the heads or the heads and fillers also act as spacers to maintain the shanks of the screw-threaded elements in their desired position.

Although the upstanding grooves are preferably left open at their upper ends to receive the heads or fillers the lower ends are best sealed off with a sealing strip or the like to prevent the ingress of dirt from the floor of a mine working.

Although the upstanding grooves can be provided directly in the exterior of the side wall, e.g. by milling, this is not essential and in further embodiments of the invention one or more components containing the grooves can be fitted to the side wall. The blocks or inserts can be formed integrally with these components or otherwise. Several components each with a main elongate body containing one of the grooves can be welded to the side wall. Alternatively, a structure containing several such grooves can be used. The grooves can also be formed partly in the webs of the side wall and partly in the external structure.

The invention may be understood more readily, and various other aspects and features of the invention may become apparent, from consideration of the following description.

BRIEF DESCRIPTION OF DRAWINGS

Embodiments of the invention will now be described, by way of examples only, with reference to the accompanying drawings wherein:

FIG. 4 is a perspective view of part of another conveyor pan constructed in accordance with the invention; and FIGS. 5 and 6 are schematic plan views of parts of further conveyor pans constructed in accordance with the invention.

DESCRIPTION OF PREFERRED EMBODIMENTS

Figure 1:
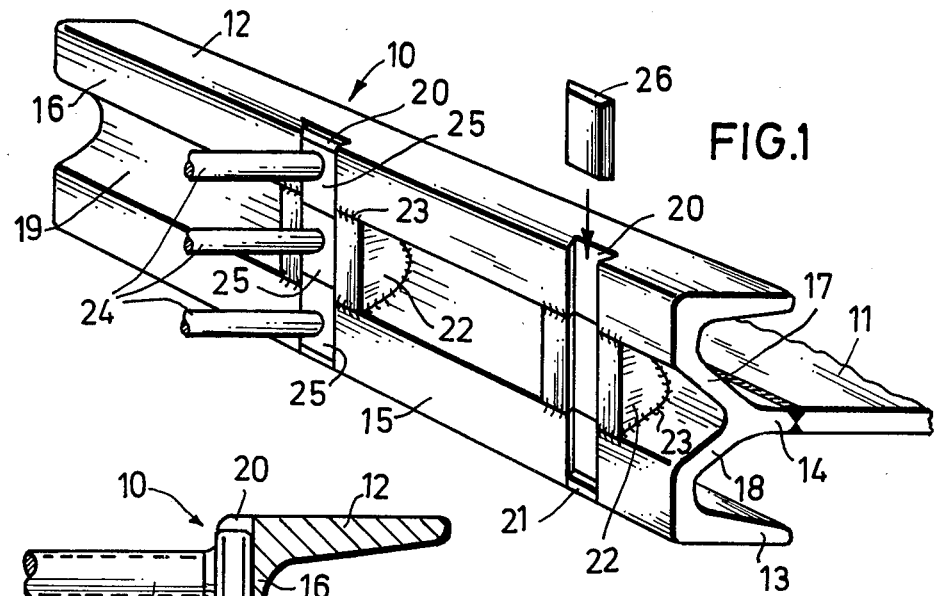
FIG. 1 is a perspective view of part of a conveyor pan constructed in accordance with the invention.
Figure 2:
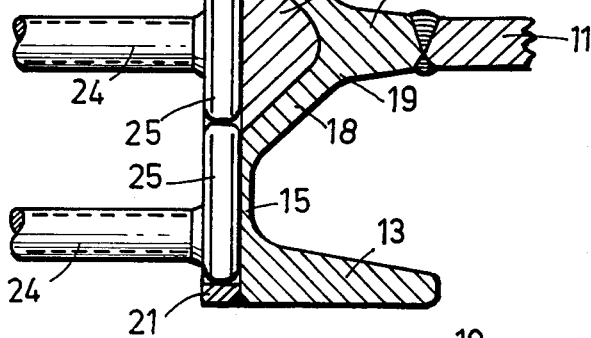
FIG. 2 is a cross-sectional view of part of the pan, the view being taken along the line 3—3 of FIG. 3.
Figure 3:
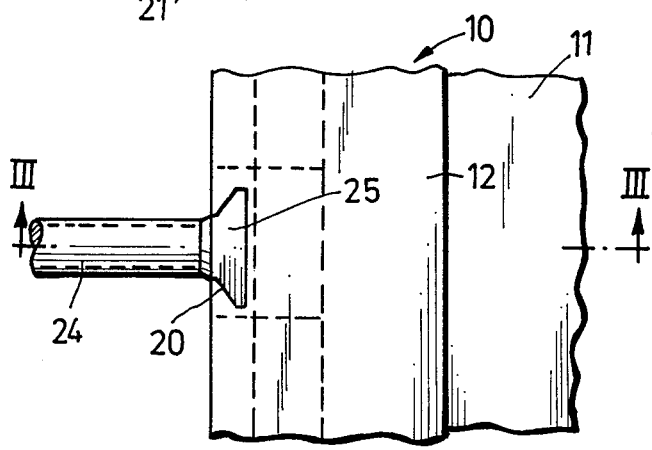
FIG. 3 is a plan view of part of the plan shown in FIGS. 1 and 2.

As is known, a pan or channel section for a scraper-chain conveyor is composed of two sigma-shaped side walls interconnected by a floor plate. For convenience, only one of the side walls and part of the floor plate are depicted in the drawings. As shown in FIGS. 1 to 3, each side wall 10 is composed of upper and lower flanges 12, 13 and a central inwardly-projecting flange 14 welded to the floor plate 11. The central flange 14 merges with converging inclined portions 17, 18 which externally define a V-shaped groove 19 extending longitudinally of the pan. Upstanding webs 16, 15 interconnect the wall portions 17, 18 with the upper and lower flanges 12, 13 respectively. As is known, the shaped side walls 10 and the floor plate 11 define upper and lower passages or channels in which a scraper-chain assembly circulates. As is also known, a series of individual pans would be arranged end-to-end and interconnected for limited relative movement.

In accordance with the invention, at least one of the side walls 10 of the pan is provided with upstanding grooves 20. The grooves 20 can be distributed over the length of the conveyor pan and each groove 20 extends over the entire height of the side wall 10. Each groove 20 is open from the upper surface of the upper flange 12 whereas the bottom end of each groove is closed by means of a sealing piece 21. As shown in FIGS. 1 to 3, the grooves 20 increase in width inwardly of the side wall in dovetail fashion. Shaped blocks or inserts 22 are fitted into the V-shaped groove 19 in the side wall 10 and these inserts 22 are welded to the side wall 10. The grooves 20 each extend through the web portions 15, 16 as well as through the inserts 22. Normally the side walls 10 of the conveyor pan would be a rolled component and the blocks 22 reinforce the wall 10 at the location of the grooves 20.

The grooves 20 form pockets for receiving the heads of screw-threaded members 24. The heads 25 of the members 24 are shaped to locate within the grooves 20 and the members 24 have screw-threaded shanks which project outwardly from the side wall 10 to permit attachments, such as spill plates, guard rails and the like to be detachably secured to the side wall 10. FIGS. 1 and 2 show how three separate members 24 can be superimposed one upon another within a common groove 20. With this arrangement the height of each head 25, i.e. along the longitudinal axis of the groove 20, is approximately one-third of the overall groove length so that the groove 20 will be substantially filled by the three heads 25. The heads 25 thus combine to form a filler for the groove 20 and the heads 25 engage on one another to ensure that the shanks of the members 24 are located with a desired spacing. As mentioned, it is envisaged that the grooves 20 would be distributed along the length of the conveyor pan. In the case where one of the grooves 20 is not used it is advisable to insert separate filler elements 26 (FIG. 1) which correspond to the heads 25 of the members 24. Thus three fillers 26, of which only one is shown in FIG. 1, would be inserted into a groove 20 to completely fill the latter. It is also possible to intersperse the fillers 26 with the heads 25 of the fixing elements 24 where one or two such elements 24 are needed in one groove 20.

In FIGS. 1 to 3 the grooves 20 are provided directly in the webs 15, 16 of the side wall 10 and in the blocks 22. Conveniently these grooves 20 may be milled. In contrast, FIG. 4 shows an alternative construction in which the grooves 20 are provided in separate components 27 which are welded to the side wall as at 28. A number of such components 27 would again be distributed over the length of the pan. As shown at the left of FIG. 4, each component 27 is composed of an elongate upstanding body provided with the groove 20 with the block 22 fitted or provided at the rear of this body and the sealing piece 21. It is however possible to weld the block 22 into the groove 19 as before and thereafter to attach the body having the groove 20 therein in position.

Instead of providing several components 27 for the side wall 10 it is possible to use a single structure attached to the said wall 10 and provided with a plurality of the grooves 20. FIG. 5 depicts this arrangement where the reference numeral 38 designates the structure mounted to the side wall 10. The structure 38 can extend over part or the entire length of the side wall 10. The inserts 22 can be fitted to the structure 38 in the manner of the component 27 shown in FIG. 4 or otherwise.

In the constructions depicted in FIGS. 4 and 5 and described above, the grooves 20 are only provided in the components 27 or the structure 38 and unlike the arrangement of FIG. 1 the grooves 20 do not penetrate the webs 15,16 of the side wall 10. FIG. 6 depicts a further construction similar to FIG. 5 but with a structure 39 of reduced thickness relative to the structure 38 of FIG. 5. The grooves 20 here extend through the structure 39 and partly into the webs 15, 16. The grooves 20 are machined after the structure 39 is fixed to the side wall 10.

I claim:

1. A conveyor channel section or pan comprising shaped side walls adjoined by a floor plate, the side walls being generally sigma-shaped with external central V-shaped grooves extending longitudinally thereof and upper and lower webs adjacent the V-shaped grooves, inserts fixed into the V-shaped external groove of at least one of the side walls to substantially fill the groove over longitudinally spaced-apart zones, upstanding elongate grooves extending over substantially the entire height of said one side wall and being located at the zones to extend through the inserts and through the upper and lower webs of the side wall, and sealing pieces closing off the upstanding grooves from beneath, wherein the upstanding grooves are re-entrant in shape to lock with the heads of screw-threaded fixing elements which are shaped to correspond therewith, with each of the grooves being open upwardly of said one side wall and being capable of receiving a plurality of said heads.

2. A conveyor pan according to claim 1, wherein at least one of the upstanding grooves receives the heads of three screw-threaded elements which fill said groove and wherein said heads engage one another to present outwardly-projecting screw-threaded shanks of the elements with equal spacing one from the next.

3. A conveyor pan according to claim 1 wherein at least another of the upstanding grooves is closed off by means of fillers each corresponding in shape and size to the head of one of the screw-threaded elements.

4. A conveyor channel section or pan comprising shaped side walls adjoined by a floor plate, the side walls being generally sigma-shaped with external central V-shaped grooves extending longitudinally thereof and upper and lower webs adjacent the V-shaped grooves, components fixed to at least one side wall, each component having an insert which fits into the V-shaped groove of said one side wall to substantially fill the groove over a zone thereof, each component having an upstanding elongate groove extending substantially over the entire height of the said one side wall, with sealing pieces closing off the upstanding grooves from beneath, wherein each upstanding groove is re-entrant in shape to lock with the heads of screw-threaded fixing elements which are shaped to correspond therewith and each groove is open upwardly of said one side wall and is capable of receiving a plurality of said heads.

5. A conveyor pan according to claim 4 wherein at least one of the upstanding grooves receives the heads of three screw-threaded elements which fill said groove and wherein said heads engage one another to present outwardly-projecting screw-threaded shanks of the elements with equal spacing one from the next.

6. A conveyor pan according to claim 2, wherein at least another of the upstanding grooves is closed off by means of fillers each corresponding in shape and size to the head of one of the screw-threaded elements.

7. A conveyor channel section or pan comprising shaped side walls adjoined by a floor plate, the side walls being generally sigma-shaped with external central V-shaped grooves extending longitudinally thereof and upper and lower webs adjacent the V-shaped grooves, a structure fitted to at least one of the side walls, said structure having a plurality of spaced-apart inserts which fit into the V-shaped groove of said wall at zones longitudinally spaced-apart and a plurality of upstanding elongate grooves formed at least partly in the structure and extending over substantially the entire height of said one side wall, sealing pieces closing off the upstanding grooves from beneath, the upstanding grooves being spaced-apart longitudinally of the side wall and being re-entrant in shape to lock with the heads of screw-threaded fixing elements which are shaped to correspond therewith, wherein each of the upstanding grooves is open upwardly of said one side wall and is capable of receiving a plurality of said heads.

8. A conveyor pan according to claim 7, wherein at least one of the upstanding grooves receives the heads of three screw-threaded elements which fill said groove and wherein said heads engage one another to present outwardly-projecting screw-threaded shanks of the elements with equal spacing one from the next.

9. A conveyor pan according to claim 7, wherein at least another of the upstanding grooves is closed off by means of fillers each corresponding in shape and size to the head of one of the screw-threaded elements.

* * * * *